United States Patent
Kawano et al.

(10) Patent No.: US 10,284,085 B2
(45) Date of Patent: May 7, 2019

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba (JP)

( * ) Notice: Subject to any disclaimer, the term of this patent is extended or adjusted under 35 U.S.C. 154(b) by 84 days.

(21) Appl. No.: 15/415,258

(22) Filed: Jan. 25, 2017

(65) Prior Publication Data

US 2017/0229958 A1 Aug. 10, 2017

(30) Foreign Application Priority Data

Feb. 5, 2016 (JP) .................. 2016-020788

(51) Int. Cl.
*H02M 3/155* (2006.01)
*H02M 3/157* (2006.01)
*H02M 1/08* (2006.01)
*H02M 3/156* (2006.01)
*H02M 1/00* (2006.01)

(52) U.S. Cl.
CPC ............ *H02M 3/157* (2013.01); *H02M 1/08* (2013.01); *H02M 3/155* (2013.01); *H02M 3/156* (2013.01); *H02M 2001/0009* (2013.01); *H02M 2001/0032* (2013.01); *Y02B 70/16* (2013.01)

(58) Field of Classification Search
CPC ............. H02M 2003/1566; H02M 2003/1557; H02M 3/156; H02M 3/158; H02M 3/1588; H02M 3/155; H02M 3/1582; H02M 3/157; H02M 3/1563; H02M 2001/0012; H02M 2001/0009; H04B 2215/069
USPC .................................. 323/282–285
See application file for complete search history.

(56) References Cited

U.S. PATENT DOCUMENTS

| | | | |
|---|---|---|---|
| 8,476,887 B2 | 7/2013 | Tateishi et al. | |
| 2009/0140708 A1* | 6/2009 | Tateishi | H02M 3/1588 323/282 |
| 2014/0247523 A1* | 9/2014 | Kawano | H02H 9/02 361/18 |
| 2015/0061615 A1* | 3/2015 | Michishita | H02M 3/1588 323/271 |

* cited by examiner

Primary Examiner — Bryan R Perez
(74) Attorney, Agent, or Firm — Brinks Gilson & Lione

(57) ABSTRACT

A switching regulator includes a comparator, an on-time control circuit, an R-S flip-flop circuit, and a timer circuit that outputs a count-up signal, where the comparator switches an operation current to a low current consumption mode in response to the count-up signal so as to reduce the operation current in a light load operating mode.

3 Claims, 4 Drawing Sheets

SWITCHING REGULATOR

RELATED APPLICATIONS

This application claims priority under 35 U.S.C. § 119 to Japanese Patent Application No. 2016-020788 filed on Feb. 5, 2016, the entire content of which is hereby incorporated by reference.

BACKGROUND OF THE INVENTION

Field of the Invention

The present invention relates to a switching regulator, and particularly to a technology of reducing current consumption at a light load.

Background Art

An electronic device is required to have low power consumption. The low power consumption is required much stronger for driving of a battery particularly in a smart phone, a portable device, a wearable device, etc. A switching regulator has been used as a voltage supply source for various electronic devices. The switching regulator is required to highly maintain efficiency even if a current supplied from its output terminal to a load changes widely from a low current to a large current.

FIG. 6 is a circuit diagram of a related art switching regulator. The related art switching regulator 600 is comprised of feedback resistors 7 and 8, a reference voltage circuit 6, a comparator 60, an R-S flip-flop circuit 62, an on-time control circuit 61, an output control circuit 63, a driver circuit 64, a power FET 2, an inductor 3, a Schottky diode 4, and a capacitor 5 (refer to, for example, Patent Document 1).

In the case of a heavy load mode in which a load current continuously flows from an output terminal OUT, the power FET 2 and the Schottky diode 4 alternately repeat on and off in such a manner that the load current coincides with the ratio between an output voltage VOUT and a power supply voltage VIN. In the heavy load mode, the power FET 2 and the Schottky diode 4 become parts which mainly consume power in the switching regulator 600.

Thus, the switching regulator 600 is capable of realizing low power consumption and high efficiency by reducing the on resistance of the power FET 2 and reducing a forward voltage Vf of the Schottky diode 4.

Patent Document 1

U.S. Pat. No. 8,476,887 Specification

SUMMARY OF THE INVENTION

However, in the case of a light load mode in which a load current discontinuously flows from the output terminal OUT, the power consumption of the comparator 60 becomes a main power loss.

It is common that the comparator 60 normally consumes a current on the order of a few μA to several tens of μA. Thus, it was difficult to highly maintain efficiency in the case of the light load mode in which the load current flowing from the output terminal OUT is 1 μA or less or a few μA.

Further, a problem arises that since a delay becomes large when the current consumption of the comparator 60 is made small, the ripple voltage of the output voltage VOUT becomes large.

In order to solve the related art problems, a switching regulator of the present invention is configured as follows.

The switching regulator is equipped with a comparator which compares a reference voltage and a feedback voltage, an on-time control circuit which controls an on time of a power FET, an R-S flip-flop circuit which outputs a signal controlling the power FET according to a signal of the comparator and a signal of the on-time control circuit, and a timer circuit which counts a prescribed time in response to the signal controlling the power FET. The timer circuit starts counting when the power FET is turned on, and outputs a count-up signal after the lapse of the prescribed time. The comparator switches an operation current to a low current consumption mode in response to the count-up signal.

According to a switching regulator of the present invention, since the switching regulator is equipped with a timer circuit, and an operation current of a comparator is reduced by the timer circuit in a light load mode, it is possible to reduce current consumption without sacrificing efficiency.

DETAILED DESCRIPTION OF THE PREFERRED EMBODIMENTS

Figure 1:
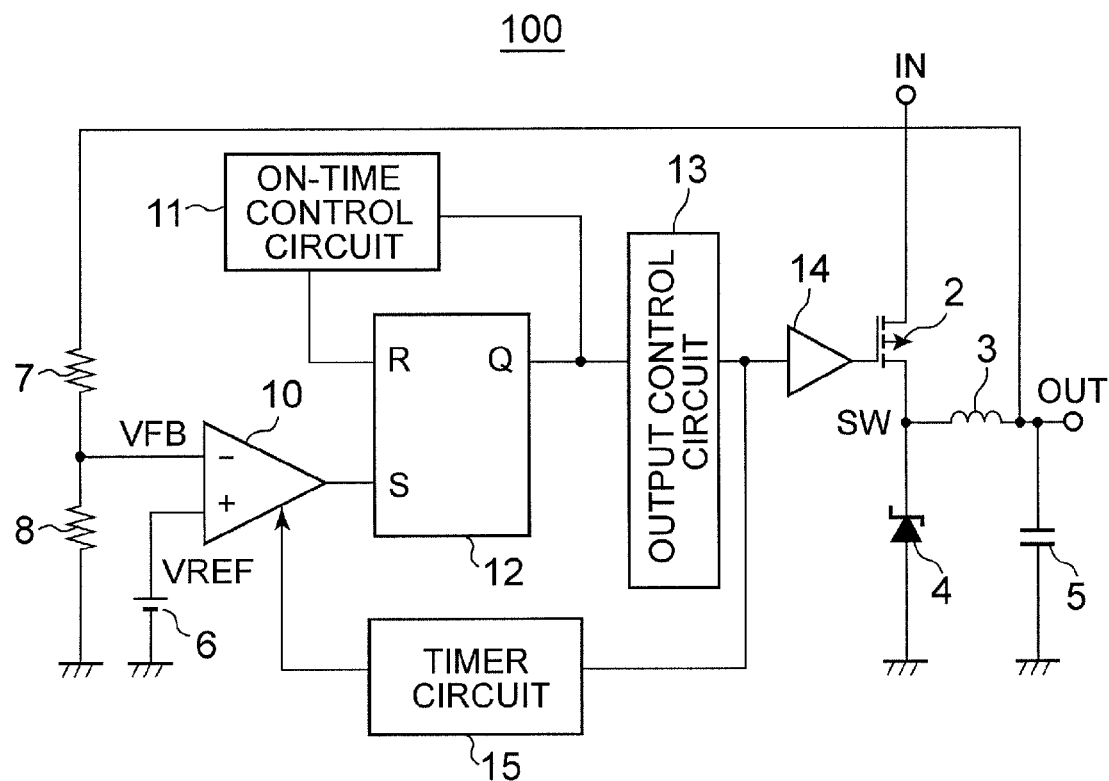
FIG. 1 is a circuit diagram illustrating one example of a switching regulator according to a first embodiment of the present invention.

FIG. 1 is a circuit diagram illustrating one example of a switching regulator according to a first embodiment of the present invention.

The switching regulator 100 according to the present embodiment is equipped with a power FET 2, an inductor 3, a Schottky diode 4, a capacitor 5, a reference voltage circuit 6, feedback resistors 7 and 8, a comparator 10, an on-time control circuit 11, an R-S flip-flop circuit 12, an output control circuit 13, a driver circuit 14, and a timer circuit 15.

The feedback resistors 7 and 8 are connected between an output terminal OUT and a GND terminal. The comparator 10 has input terminals respectively connected to output terminals of the feedback resistors 7 and 8, and the reference voltage circuit 6. The R-S flip-flop circuit 12 has a set terminal S to which an output voltage of the comparator 10 is inputted, a reset terminal R to which an output terminal of the on-time control circuit 11 is connected, and an output terminal Q connected to an input terminal of the on-time control circuit 11 and an input terminal of the output control circuit 13. The driver circuit 14 has an input terminal to which an output terminal of the output control circuit 13 is connected, and an output terminal connected to a gate of the power FET 2. The power FET 2 has a source connected to an input terminal IN and a drain connected to one terminal of the inductor 3 and a cathode of the Schottky diode 4. The output terminal OUT is connected to the other terminal of the inductor 3 and one terminal of the capacitor 5. The other terminal of the Schottky diode 4 is connected to the GND terminal. The other terminal of the capacitor 5 is connected to the GND terminal.

The operation of the switching regulator 100 according to the present embodiment will next be described.

When a voltage is inputted to the input terminal IN, the switching regulator 100 outputs an output voltage VOUT from the output terminal OUT. The feedback resistors 7 and 8 divide the output voltage VOUT to output a feedback voltage VFB. The reference voltage circuit 6 outputs a reference voltage VREF. The comparator 10 outputs a signal obtained by comparing the feedback voltage VFB and the reference voltage VREF. The on-time control circuit 11 outputs a signal determining a time during which the power FET 2 is on, from an output signal of the R-S flip-flop circuit 12. The R-S flip-flop circuit 12 and the output control circuit 13 generate a drive signal of the high-side power FET 2 from the output signal of the comparator 10 and the output signal of the on-time control circuit 11. The so-generated drive signal is outputted to the gate of the power FET 2 through the driver circuit 14.

When the output voltage VOUT is lowered and the feedback voltage VFB falls below the reference voltage VREF, the comparator 10 outputs a set signal to the set terminal S of the R-S flip-flop circuit 12. The R-S flip-flop circuit 12 outputs a signal of a high level to the output terminal Q. The output control circuit 13 outputs a signal of a low level to control and turn on the gate of the power FET 2 through the driver circuit 14. In response to the high level signal of the output terminal Q of the R-S flip-flop circuit 12, the on-time control circuit 11 outputs a reset signal of a high level to the reset terminal R of the R-S flip-flop circuit 12 after a prescribed time. The R-S flip-flop circuit 12 outputs a signal of a low level to the output terminal Q. The output control circuit 13 outputs a signal of a high level to control and turn off the gate of the power FET 2 through the driver circuit 14.

The switching regulator 100 repeats the above operation and outputs a desired output voltage VOUT from the output terminal OUT.

The timer circuit 15 starts counting in response to the signal of the low level of the output control circuit 13 by which the power FET 2 is turned on. Further, when the timer circuit 15 counts up after the lapse of a prescribed time, the timer circuit 15 outputs a signal to the comparator 10. When the comparator 10 receives the signal of the timer circuit 15 therein, the comparator 10 is shifted to a low current consumption operation. When the timer circuit 15 receives the signal of the low level of the output control circuit 13 before the lapse of a predetermined time, the timer circuit 15 resets its counter and starts counting again. Thus, the comparator 10 continues a normal current operation without shifting to the low current consumption operation.

Since the switching regulator 100 according to the present embodiment is equipped with the timer circuit 15 operated as described above, the comparator 10 is operated with a normal current indicative of a high speed operation state during the normal operation such as a heavy load. When a light load operation is reached, the comparator 10 is operated with low current consumption. Accordingly, the switching regulator 100 according to the present embodiment is capable of reducing current consumption without sacrificing efficiency.

Incidentally, the timer circuit 15 may start counting with a timing at which the power FET 2 turns on, and the signal to be inputted thereto is not limited to the signal of the output control circuit 13.

Figure 2:
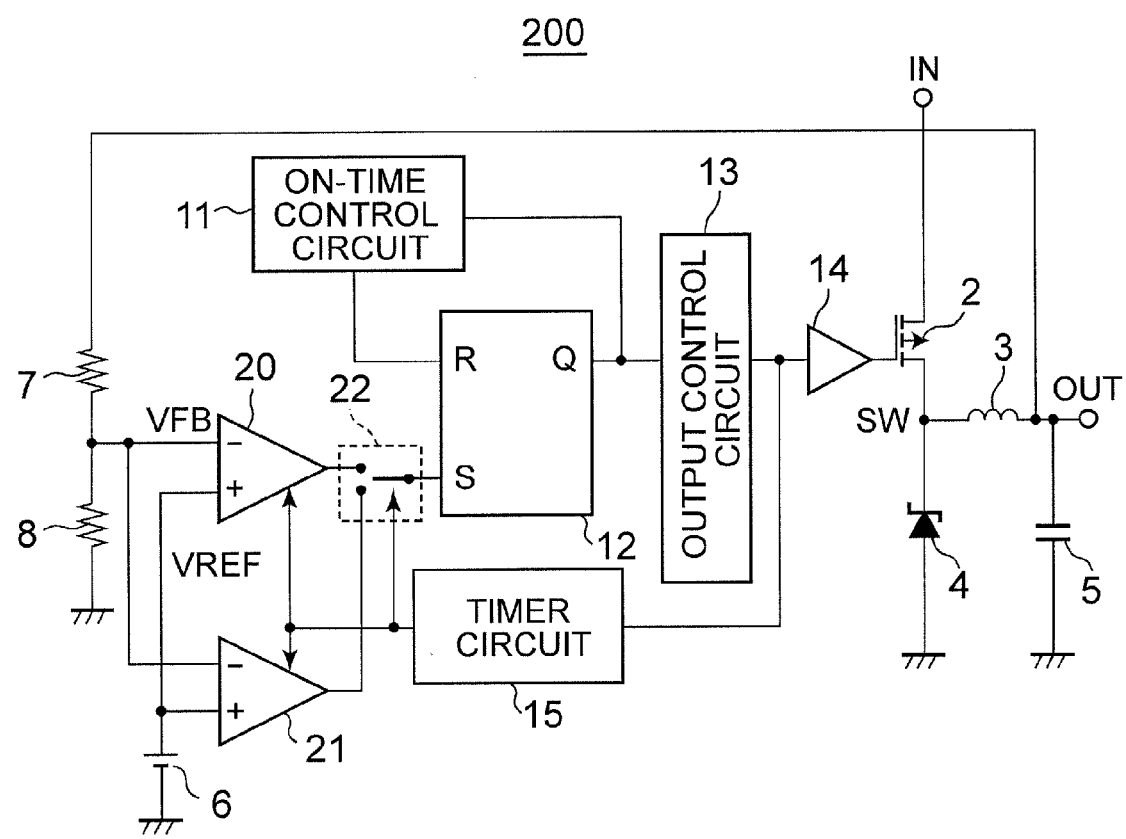
FIG. 2 is a circuit diagram illustrating another example of the switching regulator according to the first embodiment of the present invention.

FIG. 2 is a circuit diagram illustrating another example of the switching regulator according to the first embodiment of the present invention.

In FIG. 1, the comparator 10 is configured to switch between the normal current operation and the low current consumption operation according to the signal outputted from the timer circuit 15. The switching regulator 200 according to the present embodiment is equipped with a comparator 20 operated with the normal current, a comparator 21 operated with the low current consumption, and a switch circuit 22 as an alternative to the comparator 10.

The comparator 20 is operated in a normal operation such as a heavy load of the switching regulator 200 in which the timer circuit 15 does not count up. At this time, the comparator 21 stops its operation and the switch circuit 22 connects an output terminal of the comparator 20 and a set terminal S of an R-S flip-flop circuit 12.

When the timer circuit 15 outputs a count-up signal after a prescribed time has elapsed, the comparator 20 stops its operation and the comparator 21 starts its operation, so that the switch circuit 22 connects an output terminal of the comparator 21 and the set terminal S of the R-S flip-flop circuit 12.

The switching regulator 200 according to the present embodiment, which has been configured in this manner is capable of reducing current consumption without sacrificing efficiency in a manner similar to the switching regulator 100.

Further, there is an effect that since the switching regulator 200 is equipped with the comparator 20 operated with the normal current and the comparator 21 operated with low current consumption separately, it becomes easy to design the comparators even though the difference between the normal current and the low current consumption is made large.

Incidentally, although the aforementioned description has shown that the comparator 21 stops operating in the normal operation, the comparator 21 may always be operated. If done in this way, the time required to operate the comparator 21 becomes unnecessary, thereby making it possible to quickly switch from the normal operation to the low current consumption operation. Further, since the current consumption of the comparator 21 is very small during the normal operation, it does not affect the current consumption in the whole circuit.

Thus, the switching regulator 200 according to the present embodiment is capable of reducing current consumption without sacrificing efficiency.

Incidentally, the timer circuit 15 of the switching regulator according to the present embodiment brings about a similar effect even when applied to a synchronous rectification-type switching regulator.

Figure 3:
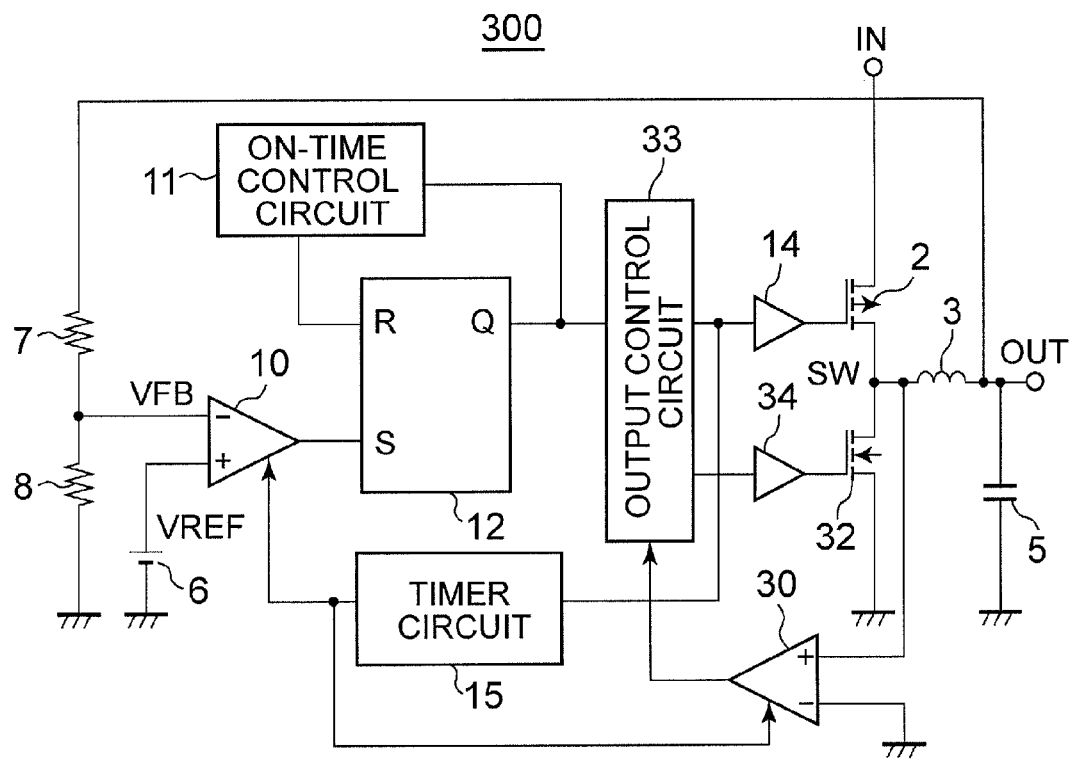
FIG. 3 is a circuit diagram illustrating one example of a switching regulator according to a second embodiment of the present invention.

FIG. 3 is a circuit diagram illustrating one example of a switching regulator according to a second embodiment of the present invention.

The switching regulator 300 according to the present embodiment is a synchronous rectification type.

The switching regulator 300 is newly equipped with an output control circuit 33, a driver circuit 34, a low-side power FET 32, and a reverse current detection circuit 30. The reverse current detection circuit 30 monitors the voltage of a node SW, detects that a current flowing through an inductance 3 at a light load becomes a current in a direction reverse to that at a heavy load, and outputs a detected signal to the output control circuit 33. Further, the reverse current detection circuit 30 is inputted with a count-up signal of a timer circuit 15 to control an operation current.

The operation of the switching regulator 300 will be omitted because it is the same as that of a general synchronous rectification type switching regulator.

When the timer circuit 15 starts a count operation according to a signal outputted from the output control circuit 33, the reverse current detection circuit 30 sets the operation current to the normal operation current in response to the signal and performs a reverse flow detection operation. Further, since the reverse flow detection operation becomes unnecessary when the timer circuit 15 outputs the count-up signal, the operation current is made small or set to zero.

Since the flow current detection circuit 30 configured in this way is provided, the switching regulator 300 is capable of further reducing current consumption.

Figure 4:
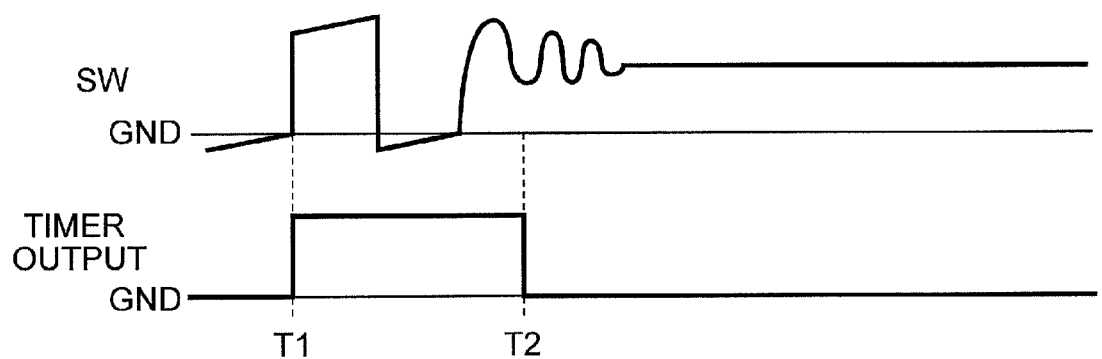
FIG. 4 is a timing chart illustrating a voltage of a node SW and an output signal of a timer circuit in a light load mode of the switching regulator according to the present embodiment of the present invention.

FIG. 4 is a timing chart illustrating a voltage of the node SW and an output signal of the timer circuit in a light load mode.

The timer circuit 15 starts counting with a timing T1 at which a power FET 2 is turned on, counts up in a prescribed time (T2-T1), and hence goes to a low level as its output.

Figure 5:
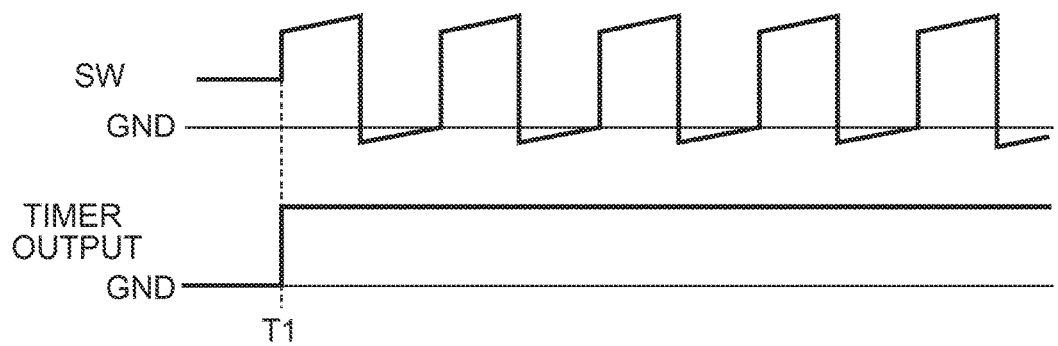
FIG. 5 is a timing chart illustrating a voltage of the node SW and an output signal of the timer circuit in a heavy load mode of the switching regulator according to the present embodiment of the present invention.
Figure 6:
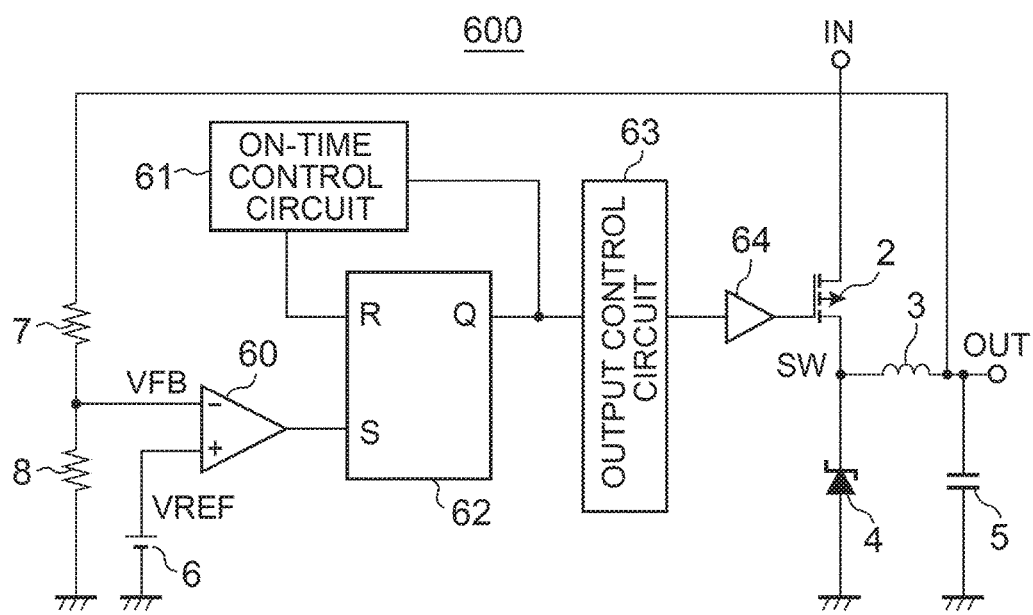
FIG. 6 is one example of a circuit diagram of a related art switching regulator.

FIG. 5 is a timing chart illustrating a voltage of the node SW and an output signal of the timer circuit in a heavy load mode.

The timer circuit 15 starts counting with a timing T1 at which the power FET 2 is turned on, and is reset before it counts up in the prescribed time (T2-T1). Therefore, the timer circuit 15 maintains its output at a high level without performing the count-up.

According to the switching regulator of the present invention, as described above, the timer circuit is provided and adapted to reduce the operation current of the comparator in the light load mode, thereby making it possible to reduce current consumption without sacrificing efficiency.

What is claimed is:

1. A switching regulator comprising:
   a comparator that compares a reference voltage and a feedback voltage;
   an on-time control circuit that controls an on time of a power FET;
   an R-S flip-flop circuit that outputs a signal controlling the power FET according to a signal of the comparator and a signal of the on-time control circuit; and
   a timer circuit connected to the comparator that counts a prescribed time in response to the signal controlling the power FET,
   wherein the timer circuit starts counting when the power FET is turned on, and outputs a count-up signal after the lapse of the prescribed time, and
   wherein the comparator switches an operation current to a low current consumption mode in response to the count-up signal.

2. The switching regulator according to claim 1, wherein the comparator further comprises:
   a first comparator driven with a normal operation current;
   a second compactor driven with an operation current smaller than the normal operation current; and
   a switch circuit that switches an output terminal of the first comparator and an output terminal of the second comparator to connect to an input terminal of the R-S flip-flop circuit,
   wherein in response to the count-up signal, the first comparator is subjected to the stop of supply of the operation current, and the switch circuit connects the output terminal of the second comparator to the input terminal of the R-S flip-flop circuit.

3. The switching regulator according to claim 1, comprising a synchronous rectification type equipped with a reverse current detection circuit, wherein the reverse current detection circuit stops the supply of an operation current in response to the count-up signal.

* * * * *